United States Patent [19]
Wenzel et al.

[11] Patent Number: 6,129,652
[45] Date of Patent: Oct. 10, 2000

[54] CALENDAR ROLL WITH COOLANT CONDUITS

[75] Inventors: Reinhard Wenzel; Peter Dornfeld, both of Krefeld, Germany

[73] Assignee: Voith Sulzer Finishing GmbH, Krefeld, Germany

[21] Appl. No.: 08/910,214

[22] Filed: Aug. 13, 1997

[30] Foreign Application Priority Data

Sep. 4, 1996 [DE] Germany .......................... 196 35 845

[51] Int. Cl.⁷ ........................................................ F28F 5/02
[52] U.S. Cl. .................................................. 492/46; 492/56
[58] Field of Search ................... 492/56, 46, 54, 492/38, 39

[56] References Cited

U.S. PATENT DOCUMENTS

| | | | |
|---|---|---|---|
| 3,074,695 | 1/1963 | Hold et al. ............................. | 165/26 |
| 3,447,600 | 6/1969 | Greene ................................... | 165/90 |
| 3,711,913 | 1/1973 | Galeone et al. . | |
| 4,605,366 | 8/1986 | Lehmann et al. ...................... | 425/143 |
| 4,631,792 | 12/1986 | Wesemann et al. ................... | 492/46 |
| 4,658,486 | 4/1987 | Schönemann ......................... | 492/46 |
| 4,683,627 | 8/1987 | Reinhold .............................. | 29/110 |
| 4,685,389 | 8/1987 | Boiseevain ............................ | 492/5 |
| 4,738,196 | 4/1988 | Boissevain ............................ | 492/5 |
| 4,823,688 | 4/1989 | Wedel et al. ........................ | 100/93 RP |
| 4,888,464 | 12/1989 | Shibata et al. ....................... | 219/216 |
| 4,955,433 | 9/1990 | Zaoralek .............................. | 492/46 |
| 5,383,833 | 1/1995 | Brugger et al. ...................... | 492/46 |
| 5,549,154 | 8/1996 | Niskanen et al. .................... | 165/89 |
| 5,848,958 | 12/1998 | Damkjaer ............................. | 492/38 |
| 5,899,264 | 5/1999 | Marschke .............................. | 165/89 |

FOREIGN PATENT DOCUMENTS

| | | |
|---|---|---|
| 492561 | 7/1992 | European Pat. Off. . |
| 178294 | 9/1905 | Germany . |
| 2227356 | 10/1975 | Germany . |
| 3231433 | 2/1984 | Germany . |
| 3920742 | 1/1990 | Germany . |
| 4219989 | 12/1993 | Germany . |
| 19533823 | 10/1996 | Germany . |
| 57-176296 | 10/1982 | Japan . |
| 2-120509 | 5/1990 | Japan . |
| 3-37410 | 2/1991 | Japan . |
| 3-173614 | 7/1991 | Japan . |
| 5-89499 | 12/1993 | Japan . |

OTHER PUBLICATIONS

Patent Abstracts of Japan of JP Patent No. 2–120509.
Patent Abstracts of Japan of JP Patent No. 3–173614.
Svenka, "Elastische Walzenbezüge für Superkalander und Softkalander," *Das Papier*, No. 10A, pp. V182–V188 (1992).
A German Office Action dated Apr. 11, 1997 issued with German Application No. 196 35 845.0–12.

*Primary Examiner*—David P. Bryant
*Assistant Examiner*—Marc W. Butler
*Attorney, Agent, or Firm*—Greenblum & Bernstein, P.L.C.

[57] ABSTRACT

A calender roll including a cylindrical base body, a cover composed of elastic plastic material, and a support cylinder composed of a light metal that carries the cover and is supported by the base body. The support cylinder may include a plurality of coolant conduits.

26 Claims, 2 Drawing Sheets

CALENDAR ROLL WITH COOLANT CONDUITS

CROSS-REFERENCE TO RELATED APPLICATIONS

The present application claims priority under U.S.C. §119 of German Patent Application No. 196 35 845.0 filed September 4, 1996, the disclosure of which is expressly incorporated by reference herein in its entirety.

BACKGROUND OF THE INVENTION

1. Field of the Invention

The present invention relates to a calender roll having an elastic plastic cover and a support cylinder. A plurality of coolant conduits may be formed to axially extend through the support cylinder, and the support cylinder may be a single unit or a plurality of annular members arranged on a cylindrical base member.

2. Discussion of the Background Information

Rolls of the type generally described above have been disclosed in, e.g., the periodical "Das Papier" [Paper], issue no. 10A, 1992, page V188. These rolls are made of a tubular base body having end plates located on both ends carrying pins. The cover, made of an elastic plastic material, is directly mounted on the tubular base body. This particular roll construction requires generous tube wall thicknesses to achieve a sufficient flectural strength, which results in rolls that are heavy and expensive. Further, the stiffening of the roll by the end plates leads to interfering edge influences. Problems are also caused from the dissipation of heat from the elastic cover. The heat arising from the high degree of high-frequency nip stress and/or from the contact heat from heated neighboring rolls.

In addition to the foregoing, German Patent Application 195 33 823.5 discloses a calender roll having a cylindrical base body, an elastic plastic cover, and a support cylinder disposed between the base body and the cover. The support cylinder is made of light metal, in particular aluminum. Further, the support cylinder can be composed of individual annular disks.

SUMMARY OF THE INVENTION

The present invention provides a calender roll that satisfies the requirements for actual use, e.g., low own weight, favorable flectural behavior, and trouble-free cooling.

The present invention achieves the above feature by providing a calender roll having a cylindrical base body, an elastic plastic cover, and a support cylinder for carrying the cover and resting against the base body that may be composed of light metal. The support cylinder may include coolant conduits that penetrate, or are formed in, the support cylinder.

The calender roll of the present invention may have an extremely low weight due to a combination of a low specific weight of the light metal and a reduction in the amount of material due to the formation of the coolant conduits. The overall weight of the calender roll of the present invention may be lower than a calender roll having a paper cover.

Further, the calender roll may be formed to have a same cross-section or a same moment of inertia over the length of the support cylinder. In this manner, the calender roll will be substantially free from interfering edge influences of the type that were occurred in the above-noted prior art tubular base bodies. Further, the roll barrel of the base body may be kept extremely short, i.e., it only needs to be as long as the cover.

The high degree of thermal conductivity of conventional light metals, in particular aluminum, provides for a favorable dissipation of heat from the cover. Further, the support cylinder should provide adequate space to form coolant conduits. In this regard. it is particularly favorable that the coolant conduits enable passage of ambient air and that the ambient air may be driven therethrough. Thus, a very simply embodied, but sufficiently powerful cooling device can be provided.

In a preferred embodiment of the present invention, the coolant conduits are open on both ends of the calender roll and a ventilator fan is provided on at at least one end face. The ventilator fan may be non-rotatably coupled to the base body.

It may be advantageous to provide, on one end of the calender roll, the cooling air conduits with an inlet opening and, on the other end of the calender roll, an outlet opening having a greater radial spacing from the roll axis than the inlet opening. In this manner, the different radial spacing of the inlet opening and outlet opening produces a forced driving of the air coolant.

It may be further advantageous to alternate the inlet openings and outlet openings with each other on each end of the calender roll. This arrangement produces a flow that goes in opposite directions in neighboring coolant conduits. Thus, a balanced temperature profile may be produced.

Another preferred manner of driving ambient air through the cooling conduits may include forming the coolant conduits to extend through the calender roll in a helix form. The helical course also provides the advantage that, in the nip, the counter roll will be positioned opposite only one section of a particular coolant conduit. Thus, very high line loads may be supported without the support cylinder suffering deformations.

In a particularly advantageous way, the support cylinder may include a plurality of annular disks having through openings uniformly distributed about the circumference for forming the coolant conduits. These annular disks may be easily produced, and, as discussed above, the through openings may provide for a very uniform dissipation of heat. The shape and size of the opening may be selected so that a sufficiently great conduit cross-section exists and that a sufficiently stable support is produced.

In particular, the through openings may be axially parallel bores, which may be particularly easy to produce. This arrangment would produce axially parallel conduits, through which, cooling air may be conveyed, e.g., via a ventilator fan. If the annular disks are positioned in an arrangement such that disks are rotated relative to one another, then the axally parallel bores may be used to produce coolant conduits that extend substantially along a helix. This particular arrangement leads to a driving of the cooling air through the conduits.

Helical coolant conduits of the type discussed above may be better produced by forming oblique bores in the annular disks. The coolant conduits produced may be open on both ends which is particularly suited for cooling with the ambient air.

It is also advantageous to form the support cylinder of a material that is substantially identical to the material of the annular disks. This facilitates ease of manufacture.

The annular disks may be coupled to the base body via a shrink fitting. Alternatively, the annular disks may be glued onto the base body. Another alternative may be to connect the annular disks to the base body via positive engagement, e.g., by groove and spring.

To obtain a uniform support cylinder, it may be preferred to glue adjacent annular disks to each other. Alternatively, the annular disks may be pressed against one another by flanged disks disposed on the end faces, e.g., with nuts. This may be particularly advantageous if the support cylinder and the elastic cover are to be attached to the base body in lieu of a cover comprised of disks of fibrous material, as is generally the case for retrofits using existing paper roll base bodies.

In this regard, it is favorable that the flanged disks are perforated in the same manner as the annular disks to form the coolant conduits.

A preferred material for forming the support cylinder is aluminum, which has a low specific weight, a favorable stability, and a high thermal conductivity, each of which is important for heat dissipation.

The present invention is directed to a calender roll that includes a support cylinder having a longitudinal axis and a plurality of coolant conduits formed within. and extending along, a longitudinal length of the support cylinder.

In accordance with another feature of the present invention, the calender roll may include a cylindrical base body. The support cylinder may include a plurality of annular disks arranged adjacent to each other and positioned on the base body.

In accordance with another feature of the present invention, each of the plurality of annular disks may include a plurality of through bores circumnferentially positioned around the annular disk. The through bores may be substantially parallel to the longitudinal axis. Further, the plurality of annular disks may be arranged to form the plurality of coolant conduits and the coolant conduits may extend substantially parallel to the longitudinal axis. Alternatively, the plurality of annular disks may be arranged to form the plurality of coolant conduits and the coolant conduits may extend in a substantially helical path around the longitudinal axis.

In accordance with still another feature of the present invention, the calender roll may include a flanged disk located at each end of the support cylinder and the flanged disks may include a plurality of bores for communicating with the coolant conduits. One of the flanged disks may include an inlet opening arranged substantially parallel to the longitudinal axis and the other of the flanged disks may include an outlet opening arranged substantially perpendicular to the longitudinal axis.

In accordance with a further feature of the present invention, the plurality of through bores may be arranged to form the coolant conduits and adjacent coolant conduits may be arranged to direct a coolant flow in opposite directions.

In accordance with yet another feature of the present invention, the calender roll may include a ventilator fan that directs an air flow through the coolant conduits. The ventilator fan may be immobile with respect to the support cylinder.

Other exemplary embodiments and advantages of the present invention may be ascertained by reviewing the present disclosure and the accompanying drawing.

BRIEF DESCRIPTION OF THE DRAWINGS

The present invention may be further described in the detailed description which follows, in reference to the noted drawing by way of non-limiting example of a preferred embodiment of the present invention, and wherein.

DETAILED DESCRIPTION OF THE PRESENT INVENTION

Figure 1:
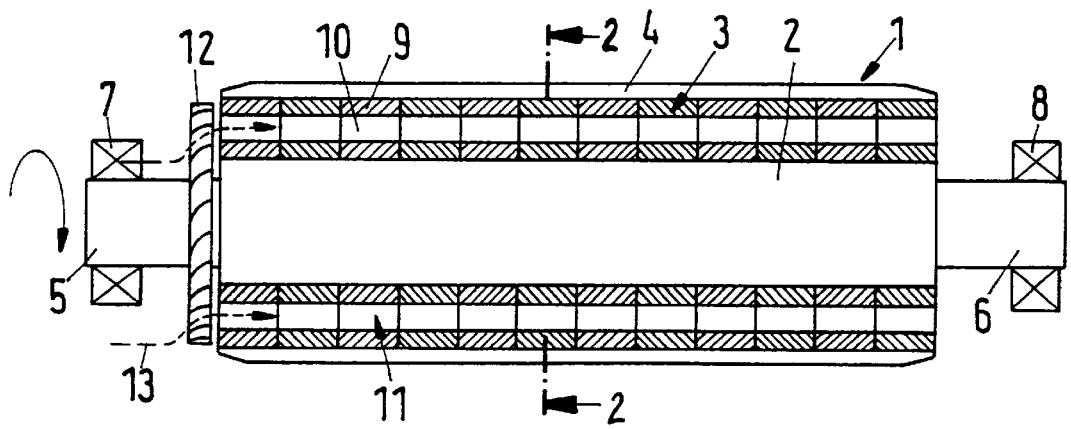
FIG. 1 illustrates a longitudinal section through a calender roll in accordance with the features of the present invention.

The particulars shown herein are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for the fundamental understanding of the invention, the description taken with the drawing figure making apparent to those skilled in the art how the invention may be embodied in practice.

FIG. 1 illustrates a calender roll 1 having a cylindrical base body 2, a support cylinder 3 made of, e.g., a light metal material, and a cover 4 made of, e.g., an elastic plastic material. Each end of base body 2, which may be utilized as an axle, includes a pin 5 and 6, respectively, extending from the end to engage with bearings 7 and 8 to facilitate rotation of calender roll 1. Base body 2 may be composed of, e.g., steel, support body 3 may be composed of, e.g., aluminum, and elastic cover 4 may be composed of, e.g., fiber-reinforced plastic, such as epoxy resin or a similar material.

Figure 2:
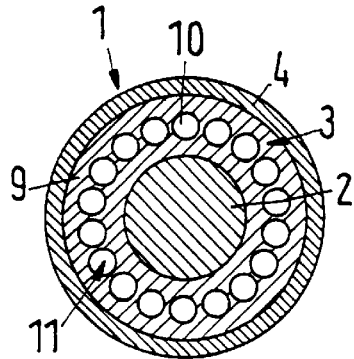
FIG. 2 illustrates a cross section along the line 2—2 in FIG. 1.

Support cylinder 3 may be further composed of, e.g., a plurality of individual annular disks 9. Individual annular disks 9 may be shrunk onto base body 2 in a conventional manner. A total length of base body 2 should be covered up or fitted with annular disks 9 so that, in the event of slight edge influences, the usable working length extends to the area of the end faces of base body 2. As illustrated in FIG. 2, each annular disk 9 may include a plurality of axially parallel bores 10 provided to form a plurality of coolant conduits 11 when the annular disks are assembled on base body 2. These bores may be uniformly distributed uniformly about a circumference of each disk in large numbers, in particular approximately 10 to 30. Further, while the weight of support cylinder is low due to the use of aluminum material in its construction, the hollow spaces or bores reduce the weight of support cylinder 3 even more.

Base body 2 may be coupled to a ventilator fan 12 that is positioned close to one end face of support cylinder 3. Ventilator fan 12 may be immobile with respect to base body 2. By rotating the calender roll 1, the ventilator fan 12 may feed ambient air along flow paths 13 and direct the same into coolat conduits 11. In this manner, and in conjunction with the favorable thermal conductivity of aluminum, excess heat may be rapidly and reliably dissipated from cover 4.

Figure 3:
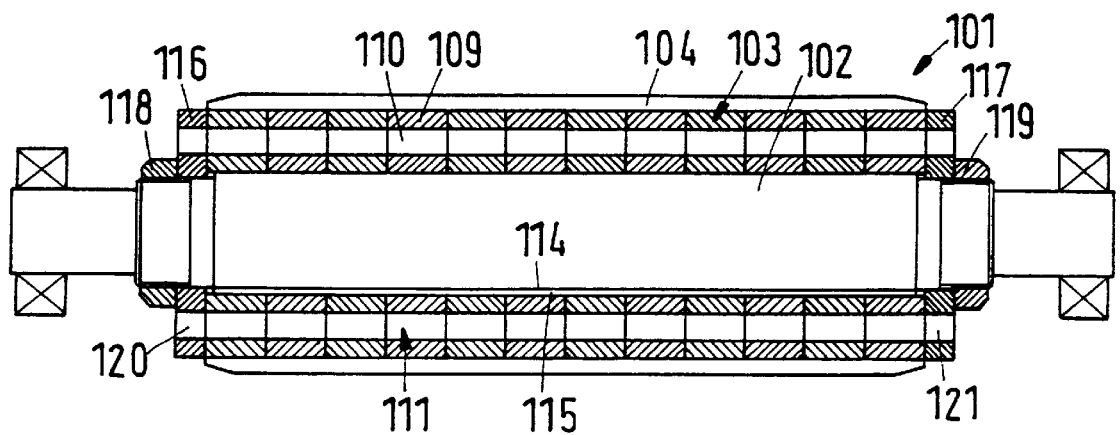
FIG. 3 illustrates a longitudinal section through an alternative embodiment of a calender roll in accordance with an alternative feature of the present invention in which a axially parallel coolant conduits helically are formed.
Figure 4:
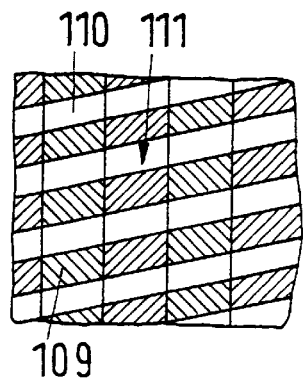
FIG. 4 illustrates a modified cylinder section showing the coolant conduits with their actual course.

In an alternative embodiment of FIGS. 3 and 4, parts corresponding to those depicted in FIGS. 1 and 2 are identified with a same reference numeral increased by 100.

Annular disks 109 may be coupled to base body 102 with positive fit. The positive engagement produces a groove-spring coupling in a conventional manner. A groove 114 and a spring 115 are shown to represent the positive fit. Further, two flanged disks 116 and 117 may be positioned at respective end faces and, via nuts 118 and 119, respectiv ely, may be utilized to axially press or force annular disks 109 against one another. Flanged disks 116 and 117 may be formed to a plurality of through openings 120 or 121, which correspond with, and communicate with, each of the plurality of coolant conduits 111.

The adjacent annular disks 109 may be arranged to form a step-wise helical path through calender roll 101. In this manner, each annular disk 109 may be rotationally offset from an adjacent annular disk along an entire longitudinal extent of support cylinder 103.

As illustrated in FIG. 4, coolant conduits 111 may, alternatively, be formed in annular disk 9, not in an axially parallel manner, but. rather, in an obliquely extending manner. The corresponding oblique bores 110 in each adjacent annular disk 109 may be aligned to form a helical course for coolant conduits 111. In this manner, when calender roll 101 is rotated air within cooling conduits 111 will be driven through support cylinder 103.

By arranging the coolant conduits 111 along a helical path, the air flow through the conduits is facilitated. Further, the portion of the calender roll 101 forming a nip during operation with a counter roll is arranged such that the counter roll is always positioned opposite only one section of a coolant conduit 111. Thus, high line loads may be supported without deforming support cylinder 103.

Figure 5:
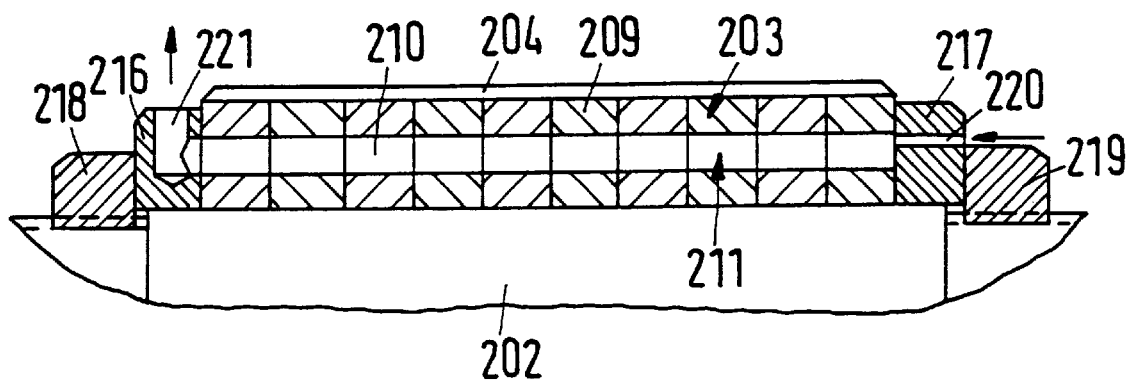
FIG. 5 illustrates a partial longitudinal section through another alternative embodiment of the present invention.

In another alternative embodiment illustrated in FIG. 5, parts corresponding to those previously depicted and discussed are identified with a similar reference numeral increased by 100 from those features depicted in FIGS. 3 and 4.

In this particular embodiment, air flow through coolant conduits 211 is not produced by a ventilator fan 12, as shown in FIG. 1, rather, air flow is produced by an arrangement in which flange disks 216 and 217 include an outlet 221 and an inlet 220 conduit, respectively, coupled to a cooling conduit 211. As shown, inlet opening 220 is axially formed within flange disk 217 and outlet opening 221 includes a radially formed outlet. Because air inlet 220 is positioned closer to the rotational axis of calender 1 than outlet 221, a forced air flow is produced through coolant conduits 211 in the direction is indicated by arrows. To facilitate air or coolant flow through coolant bores 211, outlet opening 221 may have a greater radial spacing from the roll axis than inlet opening 220.

Further, each flanged disk 216 and 217 may each include inlet 220 and outlet 221 openings which may be arranged to alternate around disk 209. In this manner, inlet openings 220 and outlet openings 221 may alternate with each another to enable air or coolant flows in neighboring coolant conduits to be directed in opposite directions. Thus, a balanced temperature profile may be produced on the surface.

Further, annular disks 209 and flanged disks 217 and 218 may be axially pressed or forced against one another, e.g., via nuts 218 and 219. Further, annular disks 209 may be secured against rotation by, e.g., a groove-spring connection or by, e.g., shrinking annular disks 209 onto base body 202.

Modifications to the embodiments depicted and discussed above are possible from a number of standpoints without departing from the basic concept of the present invention. For example, adjacent annular disks 9 may be glued to each other and/or to base body 2. The cross sectional shape of coolant conduits 11 may deviate from a circular form and may be formed in shapes that are desirable for reasons of strength, deformation behavior, or flow technology.

It is noted that the foregoing examples have been provided merely for the purpose of explanation and are in no way to be construed as limiting of the present invention. While the invention has been described with reference to a preferred embodiment, it is understood that the words which have been used herein are words of description and illustration, rather than words of limitation. Changes may be made, within the purview of the appended claims, as presently stated and as amended, without departing from the scope and spirit of the invention in its aspects. Although the invention has been described herein with reference to particular means, materials and embodiments, the invention is not intended to be limited to the particulars disclosed herein; rather, the invention extends to all functionally equivalent structures, methods and uses, such as are within the scope of the appended claims.

What is claimed is:

1. A calender roll comprising:
   a cylindrical base body;
   a cover;
   a support cylinder that carries the cover and is supported by the base body;
   an ambient air driver;
   the support cylinder including coolant conduits being arranged for passing the ambient air;
   a ventilation fan non-rotatably coupled to at least one end of the base body; and
   the coolant conduits being open on both ends.

2. The calender roll according to claim 1, further comprising an ambient air driver; and
   the coolant conduits being arranged for passing the ambient air.

3. The calender roll according to claim 2, the coolant conduits having an inlet opening on a first end and an outlet opening on a second end; and
   the outlet opening being radially spaced a greater distance from the roll axis than the inlet opening.

4. The calender roll according to claim 3, each of the first and second ends comprising alterntingly arranged inlet openings and outlet openings.

5. The calender roll according to claim 1, the coolant conduits extending in a helical course.

6. A calender roll comprising:
   a cylindrical base body;
   a cover composed of an elastic plastic;
   a support cylinder composed of a light metal, which carries the cover and which rests on the base body;
   the support cylinder including coolant conduits;
   the support cylinder comprising annular disks having through bores evenly distributed around a circumference; and
   the through bores of the annular disks cooperating to form the coolant conduits.

7. The calender roll according to claim 6, the through bores being axially parallel to a center axis of the annular disks.

8. The calender roll according to claim 6, the through bores being oblique bores with respect to a center axis of the annular disks.

9. The calender roll according to claim 6, the support cylinder comprising a plurality of identical annular disks.

10. The calender roll according to claim 6, the annular disks being shrunk onto the base body.

11. The calender roll according to of claim 6, the annular disks being glued to the base body.

12. The calender roll according to claim 6, the annular disks being coupled to the base body with a positive fit.

13. The calender roll according to claim 6, the annular disks are glued to one another.

14. The calender roll according to claim 6, the annular disks are pressed against one another by flanged disks positioned adjacent the end faces and nuts.

15. The calender roll according to claim 14, the flanged disks comprising bores to communicate with the coolant conduits.

16. The calender roll according to claim 6, the support cylinder composed substantially of aluminum.

17. A calender roll comprising:

a cover composed of an elastic plastic;

a support cylinder having a longitudinal axis adapted to carry the elastic plastic cover;

a plurality of coolant conduits formed within and extending along a longitudinal length of the support cylinder;

a cylindrical base body; and the support cylinder comprising a plurality of annular disks arranged adjacent to each other and positioned on the cylindrical base body.

18. The calender roll according to claim 17, each of the plurality of annular disks comprising a plurality of through bores circumferentially positioned around the annular disk.

19. The calender roll according to claim 18, the through bores being substantially parallel to the longitudinal axis.

20. The calender roll according to claim 19, the plurality of annular disks being arranged to form the plurality of coolant conduits;

the coolant conduits extending substantially parallel to the longitudinal axis.

21. The calender roll according to claim 19, the plurality of annular disks being arranged to form the plurality of coolant conduits; and the coolant conduits extending in a substantially helical path around the longitudinal axis.

22. The calender roll according to claim 18, further comprising a flanged disk located at each end of the support cylinder; and the flanged disks comprising a plurality of bores for communicating with the coolant conduits.

23. The calender roll according to claim 17, further comprising a ventilator fan that directs an air flow through the coolant conduits.

24. The calender roll according to claim 23, the ventilator fan being immobile with respect to the support cylinder.

25. A calender roll comprising:

a support cylinder having a longitudinal axis;

a plurality of coolant conduits formed within and extending along a longitudinal length of the support cylinder;

a cylindrical base body;

the support cylinder comprising a plurality of annular disks arranged adjacent to each other and positioned on the base body;

each of the plurality of annular disks comprising a plurality of through bores circumferentially positioned around the annular disk;

a flanged disk located at each end of the support cylinder;

the flanged disks comprising a plurality of bores for communicating with the coolant conduits;

one of the flanged disks comprising an inlet opening arranged substantially parallel to the longitudinal axis; and the other of the flanged disks comprising an outlet opening arranged substantially perpendicular to the longitudinal axis.

26. A calender roll comprising:

a support cylinder having a longitudinal axis; and a plurality of coolant conduits formed within and extending along a longitudinal length of the support cylinder;

a cylindrical base body;

the support cylinder comprising a plurality of annular disks arranged adjacent to each other and positioned on the base body;

each of the plurality of annular disks comprising a plurality of through bores circumferentially positioned around the annular disk;

the plurality of through bores being arranged to form the coolant conduits; and adjacent coolant conduits are arranged to direct a coolant flow in opposite directions.

* * * * *